United States Patent
Briand et al.

(10) Patent No.: US 6,815,635 B2
(45) Date of Patent: Nov. 9, 2004

(54) USE OF HELIUM/NITROGEN GAS MIXTURES FOR LASER WELDING TAILORED BLANKS

(75) Inventors: Francis Briand, Paris (FR); Karim Chouf, Epinay s/seine (FR); Philippe Lefebvre, Saint Ouen l'Aumône (FR); Eric Verna, Boissy l'Aillerie (FR)

(73) Assignee: L'Air Liquide, Societe Anonyme pour l'etude et, l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/458,058

(22) Filed: Jun. 10, 2003

(65) Prior Publication Data

US 2003/0230559 A1 Dec. 18, 2003

(30) Foreign Application Priority Data

Jun. 14, 2002 (FR) .......................................... 02 07343

(51) Int. Cl.[7] .......................... B23K 26/12; B23K 26/32
(52) U.S. Cl. ................................................. 219/121.64
(58) Field of Search .......................... 219/121.6, 121.63, 219/121.64, 121.65, 121.66, 121.83, 121.84, 121.85

(56) References Cited

U.S. PATENT DOCUMENTS

| | | | | |
|---|---|---|---|---|
| 3,824,368 A | * | 7/1974 | Locke | 219/121.64 |
| 5,831,239 A | * | 11/1998 | Matubara et al. | 219/121.64 |
| 5,907,135 A | * | 5/1999 | Hayakawa et al. | 181/282 |
| 6,281,472 B1 | * | 8/2001 | Faerber | 219/121.64 |

FOREIGN PATENT DOCUMENTS

| | | |
|---|---|---|
| DE | 37 26 072 A | 2/1989 |
| JP | 58093592 A * | 11/1981 |
| JP | 09220682 A * | 2/1996 |
| JP | 02002103072 A * | 4/2002 |
| WO | WO 0243918 A | 6/2002 |

* cited by examiner

*Primary Examiner*—Samuel M. Heinrich
(74) *Attorney, Agent, or Firm*—Linda K. Russell

(57) ABSTRACT

Method of welding tailored blanks consisting of a material mostly containing steel and a proportion greater than 0.015% aluminium by weight, using at least one laser beam, in which at least one weld joint of the full-penetration type is made using a gas mixture consisting of 30% to 80% nitrogen by volume, the rest being helium (up to 100%) in order to assist the said laser beam. The method of the invention is particularly recommended for welding motor vehicle elements, especially bodywork, doors, bonnets or the like.

13 Claims, 1 Drawing Sheet

USE OF HELIUM/NITROGEN GAS MIXTURES FOR LASER WELDING TAILORED BLANKS

Figure 1:
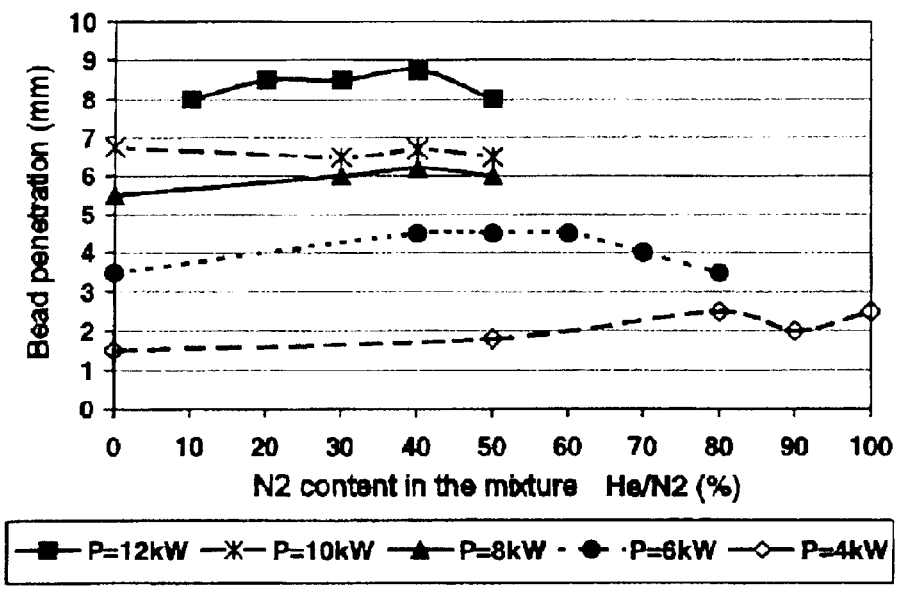

The present invention relates to the use of a gas mixture consisting solely of helium and of nitrogen in a method of laser welding tailored blanks intended to form parts of motor vehicles, in particular of tailored blanks having to be pressed after welding.

Laser beam welding is a very high performance assembly method since it makes it possible to obtain, at high speeds, penetration depths which are very great compared to other more conventional methods, such as plasma welding, MIG (Metal Inert Gas) welding or TIG (Tungsten Inert Gas) welding.

This is explained by the high power densities used when focussing, by means of one or more mirrors or lenses, the laser beam on the junction plane of the parts to be welded, for example power densities which may exceed $10^6$ W/cm$^2$.

These high power densities cause high vaporization on the surface of the parts which, on expanding outwards, causes progressive hollowing of the weld pool and leads to the formation of a narrow and deep vapour capillary, called a keyhole, in the thickness of the metal sheet, that is to say in the joint plane.

This capillary allows the energy from the laser beam to be deposited directly deep within the metal sheet, this being achieved in contrast to the more conventional welding methods where the deposition of energy is localized on the surface, as in TIG, or even MIG, welding.

For this purpose, the following documents may be mentioned: DE-A-2713904, DE-A-4034745, JP-A-01048692, JP-A-56122690, WO 97/34730, JP-A-01005692, DE-A-4123716, JP-A-02030389, U.S. Pat. No. 4,871,897, JP-A-230389, JP-A-62104693, JP-A-15692, JP-A-15693, JP-A-15694, JP-A-220681, JP-A-220682, JP-A-220683, WO-A-88/01553, WO-A-98/14302, DE-A-3619513 and DE-A-3934920.

This capillary consists of a mixture of metal vapours and of a plasma of metal vapours which have the particular property of absorbing the laser beam and of trapping the energy within the actual capillary.

One of the problems of laser welding is the formation of a covering gas plasma.

More specifically, the metal vapour plasma, by seeding the covering gas or shielding gas with free electrons, may trigger the appearance of a covering gas plasma which is detrimental to the welding operation.

The incident laser beam may then be strongly perturbed by the covering gas plasma.

The interaction of the covering gas plasma with the laser beam may take various forms but, most often, the result is that of absorbing and/or of diffracting the incident laser beam which may lead to a significant reduction in the effective laser power density on the target surface, leading to a decrease in the penetration depth, or even a loss of coupling between the beam and the material, and therefore to a momentary interruption in the welding process.

The power density threshold, above which the plasma appears, depends on the ionization potential of the covering gas used and is inversely proportional to the square of the wavelength of the laser beam.

Thus, it is very difficult to weld under pure argon with a laser of the $CO_2$ type, while this operation can be carried out with far fewer problems using a laser of the YAG type.

Generally, with $CO_2$ laser welding, helium is used as a covering gas, which is a gas with a high ionization potential and which makes it possible to protect against the appearance of the covering gas plasma up to a laser power of at least 45 kW.

However, helium has the drawback of being an expensive gas and many laser users would prefer to use other gases or gas mixtures which are less expensive than helium but which nevertheless would make it possible to limit the appearance of the covering gas plasma and therefore to obtain welding results similar to those obtained with helium but at lower cost.

Thus, commercially there are gas mixtures containing argon and helium, for example the gas mixture containing 30% helium by volume, the rest being argon, marketed under the name LASA™ 2045 by L'AIR LIQUIDE™, which gases make it possible to obtain substantially the same results as helium, for $CO_2$ laser powers less than 5 kW and provided that the power densities generated are not too high, that is to say less than about 2000 kW/cm$^2$.

However, the problem which occurs with this type of Ar/He mixture is that, for higher laser power densities, it is no longer suitable since the threshold for creating the shielding gas plasma is then exceeded.

Moreover, another known problem relates to the economic aspect of welding tailored blanks intended for the automotive field.

Specifically, the requirements of motor vehicle manufacturers for welding tailored blanks are so strict that the investment needed for producing these welds is very high.

The tailored blanks are parts forming motor vehicles which must be assembled by full penetration welding, that is to say that the weld must pass completely through the thickness of the welded part.

Given their usual low thicknesses, typically less than 3 mm, and the high welding speeds set by the motor vehicle manufacturer (>7 m/min), it is known to assemble the tailored blanks by laser welding.

Since laser welding makes it possible to obtain narrow and deep weld beads, the regions affected thermally by this welding method remain localized close to the region of interaction with the laser, limiting the dimensions of the region where the zinc surface coating is evaporated.

Laser welding of the tailored blanks requires the use of a shielding gas, which is generally helium.

The aim of the present invention is therefore to provide a laser welding method using a gas welding mixture suitable for welding thin tailored blanks, possibly having a zinc coating, and subsequently having to be shaped, especially pressed, which gas leads to forming a cooler metal plasma for welding so as to obtain a strong weld joint, that is to say which is able to withstand one or more subsequent pressing steps without breaking, and which is much less expensive than a welding method using pure helium.

The solution of the invention is therefore a method of welding tailored blanks consisting of a material mostly containing steel and a proportion greater than 0.015% aluminium by weight, using at least one laser beam, in which at least one weld joint of the full-penetration type is made using a gas mixture consisting of 30% to 80% nitrogen by volume, the rest being helium (up to 100%) in order to assist the said laser beam.

Within the scope of the invention, the term "weld joint of the full-penetration type" is understood to mean that the joint involves the entire thickness of the metal sheets to be assembled and that part of the laser beam passes through the parts or, in other words, fully penetrates to the other side of the weld bead.

The minimum aluminium content of 0.015% in the basic metal makes it possible to limit the breaking problems occurring after to welding, in particular during the steps of shaping the parts welded in this way, when the latter are made of high yield strength (HYS) steel, for example when deforming the welded parts by pressing.

In fact, the nitrogen contained in the metal in its "free" form is one of the chemical elements responsible for this effect. It contributes to the "ageing" of the steels by decreasing their deformability, which is a serious problem for metal sheets which have to be pressed.

To solve this problem, the aluminium content of the basic steel is increased so as to fix the nitrogen by promoting the formation of aluminium nitride. The nitrogen fixed in this way by the aluminium is no longer detrimental during the abovementioned deformation steps.

As a result, during the welding process, the use of shielding gas mixtures containing nitrogen mixed with helium does not lead to a detrimental effect on the quality of the weld as the aluminium content of the welded steel is enough to fix the quantities of nitrogen which are introduced into the material.

The method of the invention may comprise one or more of the following technical characteristics, as appropriate:

- the basic material of the welded metal sheets is a conventional pressing steel defined according to the EN10130 standard, a pressing steel with a high yield strength (HYS) having an elastic limit greater than 300 MPa and defined according to the EN10149 standard, or a single alloy steel according to the NFA36232 standard.
- the assist gas contains from 40 to 70% nitrogen by volume, preferably from 45 to 60% nitrogen.
- the laser is of the $CO_2$ type and has a power of from 4 to 10 kW, preferably from 6 to 8 kW.
- the laser is of the YAG type and has a power of 1 to 6 kW.
- the tailored blanks to be welded have a thickness of between 0.4 and 3 mm.
- the tailored blanks have a metal surface coating which improves their corrosion resistance, in particular a zinc surface coating obtained by galvanizing or electrogalvanizing.
- the tailored blanks to be welded are placed end to end, then welded.
- after welding, the welded blanks are subjected to at least one shaping step.
- after welding, the welded blanks undergo at least one pressing step. A pressing operation consists in giving a flat metal sheet or a flat tailored blank a three-dimensional shape obtained by deforming the metal sheet or the tailored blank by means of a press whose matrices reproduce the shape to be obtained.
- the tailored blanks consist of a material of the same grade and different thickness or else different grades and identical or different thicknesses.
- the welding is done by means of mono or multi-spot (impact) focal spot.
- the focal spot is circular or oblong.
- the gas flow rate is between 5 l/min and 100 l/min.
- the gas pressure is between 1 and 5 bar.
- the nozzle dispensing the gas is a lateral or axial nozzle having a diameter ranging from 3 to 30 mm.

According to another aspect, the invention also relates to a method of manufacturing a motor vehicle, in which a method of laser welding tailored blanks according to the invention is used.

The invention will be better understood by means of the examples illustrated below and the appended figures.

EXAMPLE 1

Effects of Increasing the Proportion of Nitrogen in Helium

Appended FIG. 1 shows the effect of gradually increasing the proportion of nitrogen added to helium on the penetration of the weld bead during laser welding using the nitrogen/helium mixtures thus obtained.

More specifically, in order to assess these effects, the penetration of melting lines made with a $CO_2$ laser focussed on the surface of a metallic target made of carbon-manganese steel by a parabolic mirror having a focal length of 200 mm was measured.

The shielding gas consisted of a $He/N_2$ mixture. The nitrogen content of the mixture was recorded as a percentage (% by volume) on the x-axis, the rest of the mixture being helium. The gas was dispensed in the interaction region by a cylinder-shaped lateral nozzle with a diameter of 12 mm and a flow rate of 24 l/min.

The welding speed was 3 m/min.

It can be seen in FIG. 1 that the penetration of the weld beads is at minimum preserved for laser powers of between 4 and 12 kW. In some cases, an increase in the penetration of the beads of about 5 to 10% is even seen. This type of result is also reproducible if one of the previous experimental parameters is varied.

EXAMPLE 2

Welding of Galvanized Tailored Blanks

Galvanized metal sheets with a thickness of 1.76 mm and having an 8 μm zinc surface layer were welded by laser beam using, on the one hand, pure helium and, on the other hand, a helium/nitrogen mixture according to the method of the invention.

The $CO_2$ laser power used was 7 kW, the focal length 200 mm and the welding speed 8 m/min.

The shielding gas was helium for the weld A and an $He/N_2$ mixture consisting of 60% helium and 40% nitrogen for the weld B (according to the invention).

The gas was distributed in the interaction region by a cylinder-shaped lateral nozzle with a diameter of 12 mm and a flow rate of 20 l/min.

Figure 2:
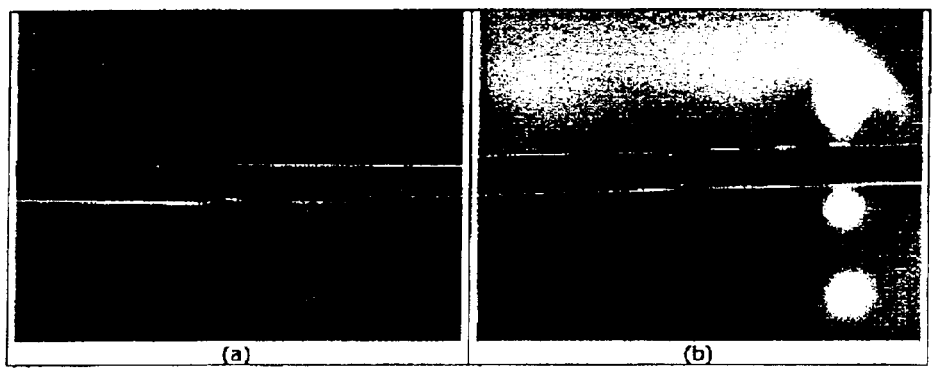

On comparing the macrographs (FIG. 2) obtained from the galvanized tailored blanks welded with pure helium (FIG. 2a) or, by way of comparison, the $He/N_2$ mixture containing 60% He and 40% $N_2$ (FIG. 2b), it can be seen that they are identical.

In other words, the weld obtained with an $He/N_2$ gas mixture according to the invention is identical to the one obtained with pure helium, this being so in spite of the presence of a high nitrogen content in the gas and in spite of the presence of zinc on the surface of the parts.

Moreover, the hardnesses of the weld beads A and B thus obtained were compared and the results are given in table 1 below.

TABLE 1

|  | Basic metal | Weld bead |
| --- | --- | --- |
| Weld A (prior art) | 97 Hv100 ± 2 | 202 Hv100 ± 2 |
| Weld B (60% He + 40% $N_2$) | 107 Hv100 ± 2 | 214 Hv100 ± 2 |

These measurements were carried out with a microhardness tester of the BUEHELER MICROMET II Digital MicroHardness Tester type. The indentation for the measurement was made with a 100 g weight which exerted a force for 15 seconds. The values shown are mean values over 3 measurements made on metal sheets welded with complete penetration, in various regions of the sheet (close to the surface, in the middle and close to the other side). Hv100 is the unit for measuring the Vickers hardness; the figure following the Hv means that the weight used for the measurement is 100 g.

Similar hardness values are found for beads made with pure helium or with an He/N$_2$ mixture.

This confirms that, surprisingly, the presence of a high proportion of nitrogen in the weld (weld A) is in no way detrimental to the hardness thereof.

Similarly, drawability tests of the Ericksen type made on the previous weld beads give similar results (cf. table 2 below). Specifically, the values for the deformation of the weld bead $H_{weld}$ are at least equal to 70% of the value of the basic metal $H_{BM}$.

TABLE 2

|  | Measurement 1 | Measurement 2 | Measurement 3 |
|---|---|---|---|
| Weld A (100% He) | $H_{Weld} = 75\% H_{BM}$ | $H_{Weld} = 75\% H_{BM}$ | $H_{Weld} = 77\% H_{BM}$ |
| Weld B (60% He + 40% N$_2$) | $H_{Weld} = 72\% H_{BM}$ | $H_{Weld} = 75\% H_{BM}$ | $H_{Weld} = 72\% H_{BM}$ |
| Weld C (80% He + 20% N$_2$) | $H_{Weld} = 72\% H_{BM}$ | $H_{Weld} = 71\% H_{BM}$ | $H_{Weld} = 70\% H_{BM}$ |

In table 2, the results obtained for a weld (weld C) obtained by laser welding under the same conditions as welds A and B but using a gas mixture according to the invention containing a lower proportion of nitrogen (that is 20% nitrogen) than for weld B are also given.

The method of the invention may serve for welding bodywork elements, such as wings, opening leaf parts, such as doors or bonnets, or hydroformed parts, such as tubular structures, or any other similar element.

What is claimed is:

1. A method of welding tailored blanks, comprising:
   providing tailored blanks comprising a material containing steel and aluminum, wherein the proportion by weight of aluminum is greater than about 0.015%; and
   producing at least one full-penetration weld joint between said tailored blanks by means of at least one laser beam and of a gas mixture consisting of nitrogen and helium, wherein the proportion by volume of nitrogen is about 30% to about 80%.

2. The method according to claim 1, wherein said laser beam is a CO$_2$ type laser beam and has a power from about 4 kW to about 10 kW.

3. The method according to claim 2, wherein said power ranges from about 6 kW to about 8 kW.

4. The method according to claim 1, wherein said as mixture comprises about 40% to about 70% of said nitrogen by volume.

5. The method according to claim 4, wherein said gas mixture comprises about 45% to about 60% of said nitrogen by volume.

6. The method according to claim 1, wherein said laser is a YAG type and has a power from about 1 kW to about 6 kW.

7. The method according to claim 1, wherein said tailored blanks have an anti-corrosive metal coating.

8. The method according to claim 1, wherein said tailored blanks have a thickness from about 0.4 mm to about 3 mm.

9. The method according to claim 7, wherein said tailored blanks have a zinc surface coating.

10. The method according to claim 1, wherein, after welding, said tailored blanks are subjected to an additional step comprising a shaping by pressing.

11. The method according to claim 1, wherein said tailored blanks comprise a steel material having an elastic limit of at least 300 MPa.

12. The method according to claim 1, wherein said method of laser welding is employed to manufacture a motor vehicle or an element of a motor vehicle.

13. The method according to claim 1, wherein said tailored blanks are elements of a motor vehicle.

* * * * *

UNITED STATES PATENT AND TRADEMARK OFFICE
CERTIFICATE OF CORRECTION

PATENT NO. : 6,815,635 B2
DATED : November 9, 2004
INVENTOR(S) : Francis Briand et al.

It is certified that error appears in the above-identified patent and that said Letters Patent is hereby corrected as shown below:

Column 6,
Line 12, please replace the word "as" with the word -- gas --.

Signed and Sealed this

First Day of February, 2005

JON W. DUDAS
*Director of the United States Patent and Trademark Office*